United States Patent [19]

Matsuo et al.

[11] Patent Number: 4,758,939

[45] Date of Patent: Jul. 19, 1988

[54] CONVERTING APPARATUS AND COMMUTATION CONTROL METHOD THEREFOR

[75] Inventors: Takayoshi Matsuo, Kobe; Keiu Kawasaki, Nakatsugawa, both of Japan

[73] Assignee: Mitsubishi Denki Kabushiki Kaisha, Tokyo, Japan

[21] Appl. No.: 40,795

[22] Filed: Apr. 21, 1987

[30] Foreign Application Priority Data

May 19, 1986 [JP] Japan .................................. 61-116357

[51] Int. Cl.$^4$ .......................................... H02M 7/145
[52] U.S. Cl. ...................................... 363/68; 363/138
[58] Field of Search .......................... 363/68, 137, 138

[56] References Cited

FOREIGN PATENT DOCUMENTS 1204319 11/1965 Fed. Rep. of Germany ........ 363/68
0112884 9/1981 Japan ..................................... 363/68

OTHER PUBLICATIONS

"Thyristor Phase-Controlled Converters and Cycloconverters, Operation, Control, and Performance", pp. 385-388, B. R. Pelly, 1971, Wiley-Interscience.

*Primary Examiner*—Patrick R. Salce
*Assistant Examiner*—Kristine Peckman
*Attorney, Agent, or Firm*—Burns, Doane, Swecker & Mathis

[57] ABSTRACT

An improvement in a commutation control method or a control circuit for a converter comprising a plurality of converter units connected in cascade, which is provided with a circuit which maintains a phase control angle of each converter unit in an about constant angular difference within a range of a specified converter output, thereby enabling precision output control, reduction of the ripple in a delivered current to a load, and an improvement in power factor of an input fundamental wave in comparison with the symmetric control.

19 Claims, 7 Drawing Sheets

(i)    (ii)    (iii)

(i)    (ii)    (iii)

CONVERTING APPARATUS AND COMMUTATION CONTROL METHOD THEREFOR

BACKGROUND OF THE INVENTION

1. Field of the Invention

The present invention relates to a converting apparatus provided with a converter including a plurality of converter units connected in cascade.

2. Description of the Prior Art

A converter for converting an AC current into a DC current basically comprises one set of full-wave rectification bridge circuits, among which there is a converter including a plurality of bridge circuits connected in cascade, thereby enabling output control within a wider range. FIG. 1 is a schematic circuit diagram of a converter disclosed in "Thyristor Phase-Controlled Converters and Cycloconverters" by B. P. Pelly, published by Wiley Interscience in 1971. This converter includes two six-phase bridge circuits, called the converter units 1 and 2 in this specification, which are connected in cascade with each other. This connected one is called the converter in this specification and the entire converter inclusive of a commutation control circuit (not shown in FIG. 1) is called the converter apparatus therein.

A three-phase AC power source 8 is connected to the primary winding 51 of a step-down insulating transformer 5, the secondary winding 52 and the tertiary winding 53 thereof which are equal in the number of windings, being connected to AC input terminals at the converter units 1 and 2 respectively, the primary and secondary windings being delta-connected and the tertiary winding being star-connected, whereby AC voltage applied to the converter units 1 and 2 has a phase difference of 30°.

The converter units 1 and 2 consist of silicon controlled rectifiers SCR 4 connected in a six-phase bridge manner so that DC outputs of the converter units connected in cascade are given to a load 3. In FIG. 1, reference e designates voltage of AC power source 8, $e_{oa}$ and $e_{ob}$ designate the secondary and tertiary voltages of the transformer 5 respectively, Voa and Vob designate each output voltage of the converter units 1 and 2, Vo designates the sum of Voa and Vob, that is, output voltage of the converter, and Io designates a load current.

For commutation control for the converter, there are two systems, that is, an asymmetric control system which always keeps an output of the one converter unit maximum and adjusts an output of the other, and a symmetric control system which simultaneously adjusts both the converter units to be equalized to each other.

FIG. 2 is a vector diagram at the AC base in the asymmetric control system when voltage Vo of the converter output is 1, 0.75 or 0.25 (corresponding to (i), (ii) or (iii) in FIG. 2 respectively), in which, when both the converter units 1 and 2 output the maximum voltages, Vo corresponds to the above mentioned 1, and the output Voa of converter unit 1 is kept constant to thereby adjust the output of the converter unit 2. Each reference $\phi_o$ designates a phase angle between Vo and Io.

FIG. 3 is a vector diagram showing the AC bases in the symmetric control system when the converter output voltage Vo is 1, 0.75 or 0.25 as the same as FIG. 2.

FIG. 4 is a circle diagram showing a relation between the output voltage Vo of the converter and the reactive power of a fundamental wave at the AC power source 8, which is represented by a ratio in the case when the asymmetric control is applied with respect to the case when the symmetric control is applied, with keeping Io constant. In the case of symmetric control, when the output voltage is $V_{o3}$ ($Voa = Vob = V_{o3}/2$), the reactive power $Q_1$ is generated. On the contrary, in the case of the asymmetric control ($V_{o3} = Voa + Vob$ and $Voa > Vob$), the reactive power is $Q_2$, whereby the reactive power may be smaller by $Q_3 (=Q_1 - Q_2)$ than that in the case of the symmetric control. In FIG. 4, the SCR 4 constituting the converter units 1 and 2 is assumed to operate as an ideal switch.

As above mentioned, the asymmetric control system is advantageous in that the reactive power is less to create, however, since a phase control angle of SCR 4 is fixed to allow one converter unit to always output the maximum voltage, a cycle period adjustable of the output voltage Vo becomes two times as long (a cycle period of 60° in the example of FIG. 1) as that of the symmetric control system. Accordingly, the asymmetric control system is inferior to the symmetric control system in that precision control is impossible when Io is adjusted by adjusting Vo. When both converters simultaneously carry out the commutation, the asymmetric control system is inferior to the symmetric control system in that the ripple in a load current Io is larger than that of the latter, because the output of the one converter unit in the asymmetric control system is kept maximum and the ripple of the output voltage is larger than that of the symmetrical control system.

SUMMARY OF THE INVENTION

An object of the present invention is to provide a converter apparatus or a commutation control method therefor, which makes a difference of the phase-control angle between both converter units constant (not zero) within a specified range of output voltage to thereby reduce an adjustable cycle period for the output voltage and also reduce the ripple in the load current.

Another object of the present invention is to provide a converter apparatus or a commutation control method therefor, which applies the asymmetric control system when out of the above-mentioned range to thereby generate the less reactive power in the fundamental wave than that of the symmetric control system.

The above and further objects and features of the invention will more fully be apparent from the following detailed description with accompanying drawings.

DESCRIPTION OF THE PREFERRED EMBODIMENT

Next, an embodiment of a converter apparatus or a commutation control method therefor of the present invention will be described in detail in accordance with the accompanying drawings.

Figure 1:
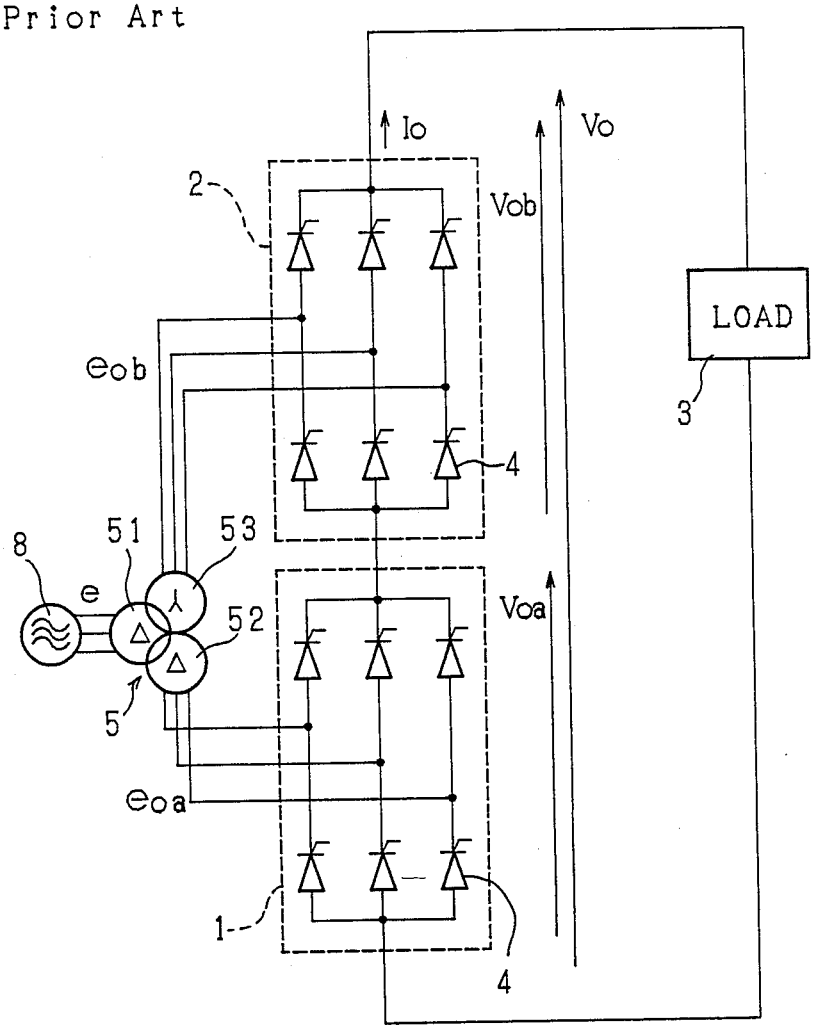
FIG. 1 is a schematic circuit diagram of the conventional converting apparatus.
Figure 2:
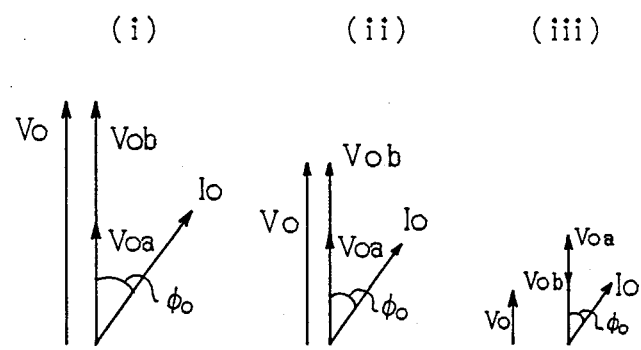
FIGS. 2 and 3 are vector diagrams showing the relation between output voltages and load currents in asymmetric and symmetric control systems.
Figure 3:
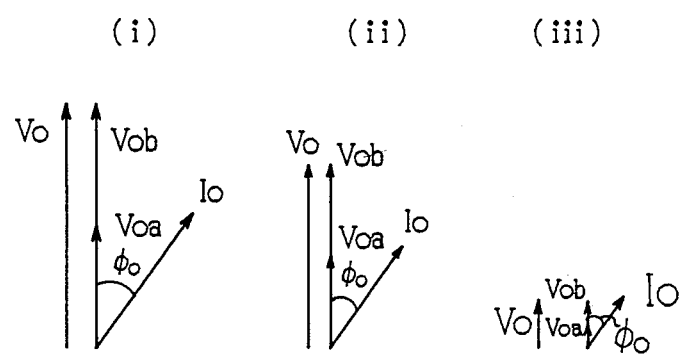
Figure 4:
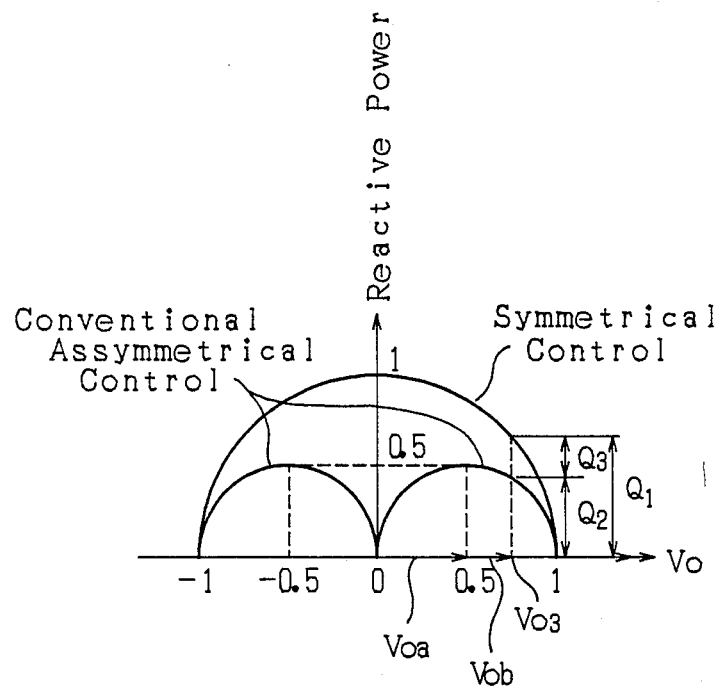
FIG. 4 is a circle diagram showing the relation between the output voltage and the reactive power at the conventional symmetric control system and asymmetric control system.
Figure 5:
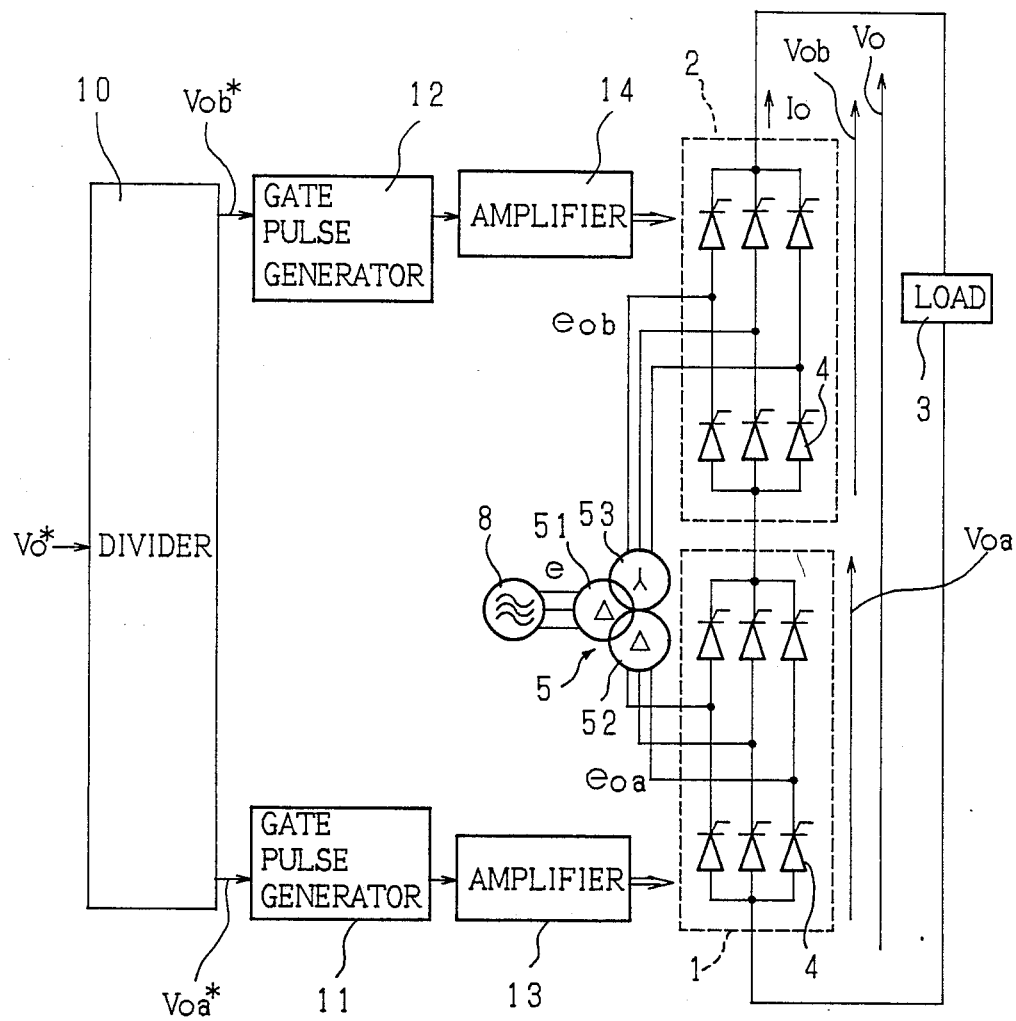
FIG. 5 is a schematic circuit diagram of a converting apparatus of the present invention.

FIG. 5 shows a converting apparatus of the present invention, in which the portion shown in FIG. 1 is the same as that of a conventional one. That is, a three-phase AC source 8 is connected to the primary winding 51 at a step-down insulating transformer 5, and the secondary winding 52 and the tertiary winding 53 are connected to the AC terminals at the converter units 1 and 2. The windings at the transformer 5 are in delta-delta-star connections, AC voltage applied to the converter units 1 and 2 having a phase difference of 30°.

The converter units 1 and 2 consist of the SCR 4 connected in six-phase bridge manner, so that a DC output of the converter comprising the converter units 1 and 2 connected in cascade is applied to a load 3.

The reference e designates voltage of the AC power source 8, $e_{oa}$ and $e_{ob}$ designate voltages at the secondary and tertiary windings of transformer 5 respectively, Voa and Vob designate output voltages of the converter units 1 and 2 respectively, Vo designates the sum of Voa and Vob, that is, output voltage of the converter, and Io designates a load current.

Next, explanation will be given on a commutation control circuit of the present invention. Referring to FIG. 5, reference numeral 10 designates a divider, which is given a signal (data) Vo* corresponding to voltage Vo to be output from the converter so as to compute and output signals (data) Voa* and Vob* corresponding to voltages Voa and Vob to be output from the converter units 1 and 2 respectively on the basis of the signal Vo*, and the contents of the computation thereof will be discussed below. The signals Voa* and Vob* are input into gate pulse generators 11 and 12 respectively. The gate pulse generators 11 and 12 are given at least one phase voltage of the second and tertiary windings 52 and 53, and, on the basis thereof, output gate pulses to trigger the SCR in phase decided by Voa* and Vob*, the gate pulses being amplified by amplifiers 13 and 14 and thereafter being given to the gates at the SCR 4 of the converter units 1 and 2. It goes without saying that the gate pulse given to the SCR 4 in the same converter unit is shifted by 120° at each phase, and the phase shift between the positive and the negative is 180°. And, between the converter units 1 and 2, each corresponding SCR has an angular difference to be discussed below.

Next, explanation will be given on the content of computation by the divider 10. When Vo is set within a predetermined range, the divider 10 computes Voa* and Vob* to meet the condition of making the angular difference between the conduction phases of converter units 1 and 2 to be a predetermined value. In a case where the phase difference between $e_{oa}$ and $e_{ob}$ is 30° as in this embodiment, the aforesaid angular difference is defined to 60° or 120°. In addition, these values of angle are not strict but need only to be about equal to the above. Also the angular difference is not defined only to 60° or 120° and the conduction phase of any converter unit may lead.

Next, assuming that the conduction phase of the converter unit 1 leads by 60° with respect to that of the converter unit 2, the above computation will be described in accordance with FIG. 6.

Figure 6:
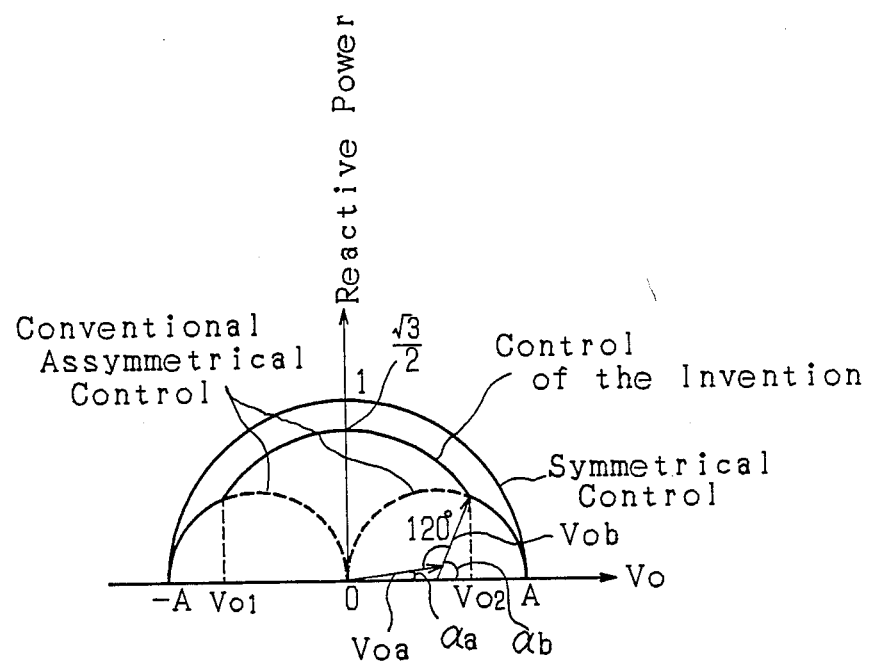
FIG. 6 is a vector diagram showing the relation between the output voltage and the reactive power when a commutation control system of the present invention is applied.

The output voltages of the converter units 1 and 2 in the case when the conduction phase is 0°, that is, the maximum output voltage thereof is represented by A/2 and the conduction phase angles of converter units 1 and 2 being represented by αa and αb, output voltages Voa and Vob of the converter units 1 and 2 are given in the following equations:

$$Voa = (A/2) \cos \alpha a \quad (1)$$

$$Vob = (A/2) \cos \alpha b \quad (2)$$

where within a range of αb = αa + 60°, now assuming $Vo_1 \leq Vo \leq Vo_2$ as shown in FIG. 6, Vob is expressed by the following equation:

$$Vob = (A/2) \cos(\alpha a + 60°) \quad (2')$$

Since the sum of both voltages is the output voltage Vo, within a range of $Vo_1 \leq Vo \leq Vo_2$, the following equation is obtained:

$$\begin{aligned} Vo &= Voa + Vob \\ &= \sqrt{3}/2)A \cos(\alpha a + 30°). \end{aligned} \quad (3)$$

Accordingly, the conduction phase angles αa and αb that meet the above condition are given in the following equations:

$$\alpha a = \cos^{-1}(2Vo/\sqrt{3} A) - 30° \quad (4)$$

$$\begin{aligned} \alpha b &= \alpha a + 60° \\ &= \cos^{-1}(2Vo/\sqrt{3} A) + 30° \end{aligned} \quad (5)$$

From the equations (1) and (4), and on the basis of the predetermined value A and the signal Vo* given at every control, the divider 10 computes Voa in the following equation:

$$Voa = (A/2) \cos [\cos^{-1}(2Vo/\sqrt{3A}) - 30°] \quad (6)$$

and Vob is obtained as the following equation:

$$Vob = Vo - Voa \quad (7)$$

Thus, the signals Voa* and Vob* corresponding to Voa and Vob are output to the gate pulse generators 11 and 12 respectively. The relation between Vo, Voa, Vob, Vo*, Voa* and Vob* is decided by the divider 10, the circuitry precedent and following thereto, and constitutions of the gate pulse generators 11 and 12.

When Vo exceeds a certain positive value, αa becomes too small, thereby making the commutation impossible. On the contrary, when Vo falls below a certain negative value, αb becomes too large, thereby making the commutation impossible. When such values of αa and αb are represented by αa min. and αb max., the values of Vo corresponding to thereto, as is obvious from the equation (1), is given in the following equations:

$(\sqrt{3}/2)A \cos (\alpha a \min. + 30°)$, and $(\sqrt{3}/2)A \cos (\alpha b \max. - 30°)$.

These values correspond to the aforesaid $V_{O2}$ and $V_{O1}$ respectively.

The commutation method may apply the conventional symmetric control system or the asymmetric control system when out of such range of $V_{O1} \leq V_O \leq V_{O2}$.

FIG. 6 shows the relation when the asymmetric control system is applied. When $V_O > V_{O2} = (\sqrt{3}/2)A \cos (\alpha a \min. + 30°)$, $\alpha a$ is fixed to $\alpha a$ min. (preset) and $\alpha b$ is adjusted to obtain $V_O$, thereby enabling an output up to $V_O = A/2 + A/2 = A$. When $V_O < V_{O1} = (\sqrt{3}/2)A \cos (\alpha b \max. - 30°)$, $\alpha b$ is fixed to $\alpha b$ max. (preset) and $\alpha a$ is adjusted to obtain $V_O$, thereby enabling an output up to $V_O = (-A/2) + (-A/2) = -A$. When such an asymmetric control system is applied, the reactive power in the entire region is smaller than that of the conventional symmetric control system as is obvious from FIG. 6.

In FIG. 6, the arrows vector-note Voa and Vob when $V_{O1} \leq V \leq V_{O2}$, and an angle 120° shows a supplementary angle to a leading angle of Voa with respect to Vob.

On the contrary, when the symmetric control system is applied, Voa* and Vob* need only be computed on the basis of $V_O^*$ so as to obtain $V_{oa} = V_{ob} = V_O/2$ within the range of $V_O > V_{O2}$ and $V_O < V_{O1}$.

Thus, even when the symmetric control system is partly applied, the reactive power decreases within the range of $V_{O1} \leq V_O \leq V_{O2}$, thereby enabling an improvement of about $13\% (=1 - \sqrt{3}/2)$ in a case of $V_O = 0$.

Figure 7:
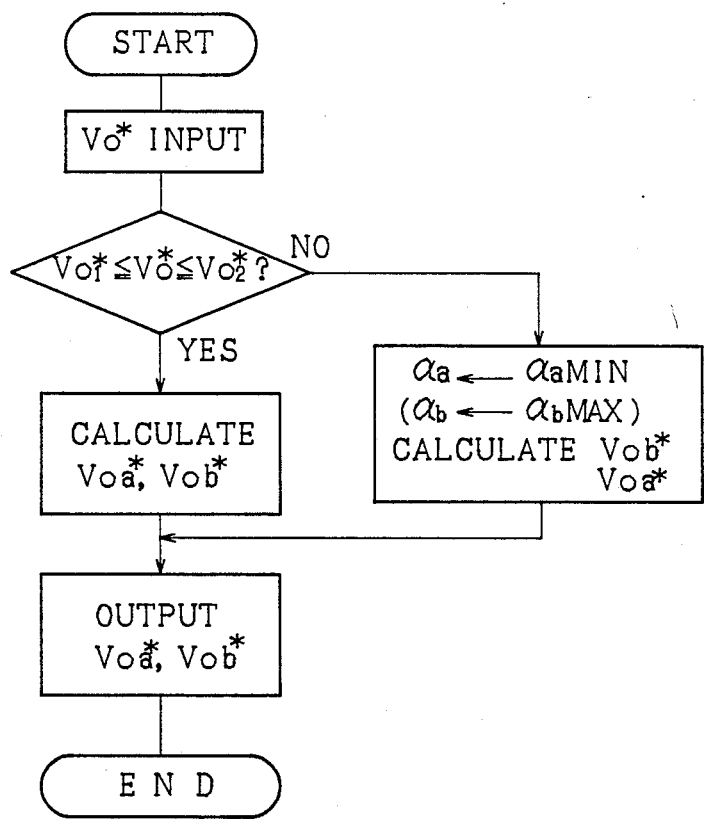
FIG. 7 is a schematic flow chart showing the content of computation of a divider.

FIG. 7 is a schematic flow chart showing the content of the aforesaid computation by the divider 10 when the asymmetric control system is applied within the range of $V_{O1} \leq V_O \leq V_{O2}$.

In the present invention, the conduction phase of each converter unit is not fixed at least out of the range of the specified voltage $V_O$, whereby the adjustable cycle period becomes the same as that of the symmetric control system, thereby precision control is realized.

Also, for the reason that the commutation of both the converter units are not carried out simultaneously, the ripple in the load current becomes less than the conventional symmetrical control system.

Figure 8:
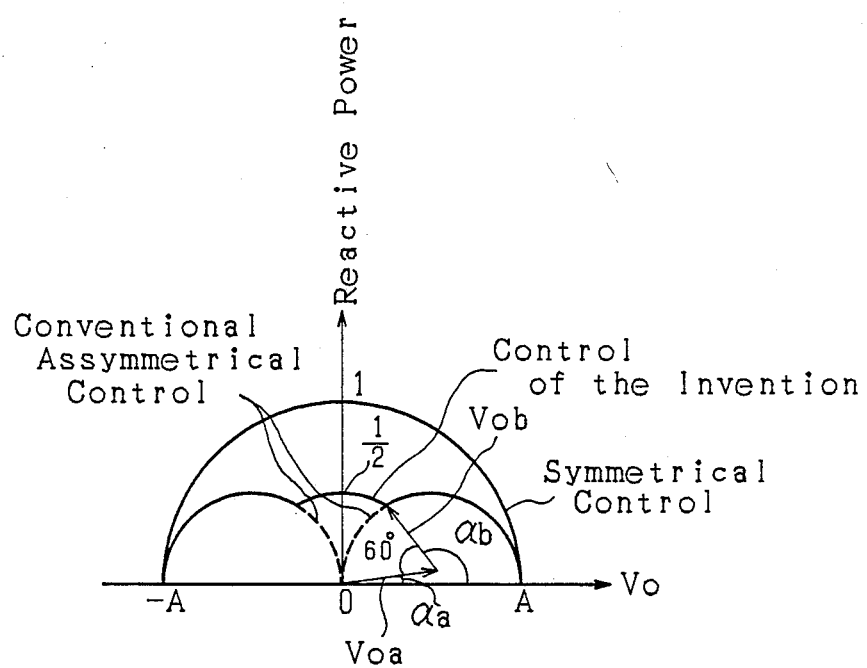
FIG. 8 is a vector diagram showing the relation between the output voltage and the reactive power when a difference between αa and αb is assumed to be 120°.

In the aforesaid embodiment, a difference between $\alpha a$ and $\alpha b$ is defined to 60° to apply symmetry property to each conduction phase in the three-phase alternating current. Hence, 120° may be available. In this case, the reduction of the reactive current when $V_O = 0$ is carried out further effectively as shown in FIG. 8.

In the above embodiment, voltages of the power source applied to the converter units 1 and 2 have a phase shift of 30°. The present invention is applicable to voltage of optional phase shift, for example, when the voltage is inphase or have a phase difference of 60°, the phase difference between the phase control angles $\alpha a$ and $\alpha b$ is made 30°, 90° or 150°, whereby the timing of commutation can be made similar to the use of the symmetric control for a twelve-phase converter, and the reactive power of fundamental wave from the input power supply can be also improved.

In the above embodiment, the case where the commutation of the converter units 1 and 2 are carried out always at equal intervals has been described. However, when it is important to improve the reactive power in the fundamental wave of the input power source, the phase difference between the phase control angles $\alpha a$ and $\alpha b$ is increased to raise the degree of improvement, whereby the phase difference between the phase control angles $\alpha a$ and $\alpha b$ may alternatively be determined corresponding to the condition to be required for the converting apparatus.

Furthermore, the present invention is applicable even when the maximum values of output voltage of the converter units are not equal, and even when the number of converter units is three or more.

This invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A commutation control method for a converting apparatus provided with a converter including a plurality of converter units connected in cascade and each comprising controlled rectifiers in bridge connection so as to control respective conduction phases of said controlled rectifiers at each of said converter units on the basis of a set value of voltage to be output from said converter,
   said method being characterized in that in a case where the output voltage of said converter is set within a predetermined range, the output voltage of each of said converter units meets the condition that said conduction phase of each of said converter units is maintained at a substantially constant, non-zero angular difference from one another.

2. A commutation control method for a converting apparatus as set forth in claim 1, wherein, when a phase difference of input AC voltage of each of said converter units if 0°, an angular difference of conduction phase at each of said converter units is 30°, 90° or 150°.

3. A commutation control method for a converting apparatus as set forth in claim 1, wherein, when a phase difference of input AC voltage of each of said converter units is 30°, an angular difference of conduction phase at each of said converter units is 60° or 120°.

4. A commutation control method for a converting apparatus as set forth in claim 1, wherein, when a phase difference of input AC voltage of each of said converter units is 60°, an angular difference of conduction phase at each of said converter units is 30°, 90° or 120°.

5. A converting apparatus provided with a converter including a plurality of converter units connected in cascade and each comprising controlled rectifiers in bridge connection,
   gate pulse generators each controlling timing on the basis of a voltage value to be output from each of said converter units and the phase of input AC voltage thereof and generating gate pulses to allow said controlled rectifiers of each of said converter units to conduct, and
   a divider which is given a signal corresponding to the voltage to be output from said converter and outputs a signal corresponding to the voltage to be output from each of said converter units,
   said converting apparatus being characterized in that said divider is provided with output voltage discrimination means which discriminates whether or not the voltage to be output from said converter is within a predetermined range or not, and output voltage decision means for computing the output voltage of each of said converter units to meet the condition that the conduction phase of each of said converter units is maintained at a substantially constant, non-zero angular difference from one another when said output voltage discrimination means determines that the voltage to be output from said converter is within the predetermined range.

6. A converting apparatus as set forth in claim 5, wherein said output voltage decision means decides said angular difference on the basis of a phase difference of AC voltage given to each of said converter units.

7. A converting apparatus as set forth in claim 6, wherein, when said phase difference is 0°, said angular difference is 30°, 90° or 150°.

8. A converting apparatus as set forth in claim 6, wherein, when said phase difference is 30°, said angular difference is 60° or 120°.

9. A converting apparatus as set forth in claim 6, wherein, when said phase difference is 60°, said angular difference is 30°, 90° or 150°.

10. A converting apparatus provided with a converter including a plurality of converter units connected in cascade and each comprising controlled rectifiers in bridge connection, a gate pulse generator which controls timing on the basis of a voltage value to be output from each said converter units and generates gate pulses to allow said controlled rectifiers at each of said converter units to conduct, and a divider which is given a signal corresponding to the voltage to be output from said converter and outputs a signal corresponding to the voltage to be output from each of said converter units, said converting apparatus being characterized in that said divider is provided with output voltage discrimination means to discriminate whether the voltage to be output from said converter is within a predetermined range or not, and output voltage decision means which computes the output voltage from each of said converter units to meet the condition that the conduction phase of each of said converter units is maintained at a substantially constant, non-zero angular difference from each other when said output voltage discrimination means determines that the voltage to be output from said converter is within a predetermined range and which computes the output voltage from each of said converter units to meet the condition that the conduction phase of a converter unit is set to a predetermined value when the voltage to be output from said converter is out of said predetermined range.

11. A converting apparatus as set forth in claim 10, wherein said output voltage decision means decides said angular difference on the basis of a phase difference of AC voltage given to each of said converter units.

12. A converting apparatus as set forth in claim 11, wherein, when said phase difference is 0°, said angular difference is 30°, 90° or 150°.

13. A converting apparatus as set forth in claim 11, wherein, when said phase difference is 30°, said angular difference is 60° or 120°.

14. A converting apparatus as set forth in claim 11, wherein, when said phase difference is 60°, said angular difference is 30°, 90° or 150°.

15. A converting apparatus as set forth in claim 10, wherein, said predetermined value is the phase angle value which results in the maximum output voltage of said converter unit.

16. A converting apparatus as set forth in claim 15, wherein, said output voltage decision means decides said angular difference on the basis of phase difference of AC voltage given to each of said converter units.

17. A converting apparatus as set forth in claim 16, wherein, when said phase difference is 0°, said angular difference is 30°, 90° or 150°.

18. A converting apparatus as set forth in claim 16, wherein, when said phase difference is 30°, said angular difference is 60° or 120°.

19. A converting apparatus as set forth in claim 16, wherein, when said phase difference is 60°, said angular difference is 30°, 90° or 150°.

* * * * *